(12) United States Patent
Tenuta et al.

(10) Patent No.: US 9,250,754 B2
(45) Date of Patent: Feb. 2, 2016

(54) PRESSURE-SENSITIVE TRACKPAD

(71) Applicant: Google Inc., Mountain View, CA (US)

(72) Inventors: Matthew D. Tenuta, San Jose, CA (US); Aaron Leiba, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/843,152

(22) Filed: Mar. 15, 2013

(65) Prior Publication Data

US 2014/0085254 A1 Mar. 27, 2014

Related U.S. Application Data

(60) Provisional application No. 61/706,304, filed on Sep. 27, 2012.

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0414* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 5,847,690 A | | 12/1998 | Boie et al. |
| 6,002,389 A | * | 12/1999 | Kasser ........................ 345/173 |
| 6,483,498 B1 | | 11/2002 | Colgan et al. |
| 8,098,233 B2 | | 1/2012 | Hotelling et al. |
| 8,274,494 B2 | | 9/2012 | Frey et al. |
| 8,432,362 B2 | | 4/2013 | Cheng et al. |
| 2005/0140661 A1 | | 6/2005 | Collins |

(Continued)

FOREIGN PATENT DOCUMENTS

| | | |
|---|---|---|
| GB | 2445178 A | 7/2008 |
| WO | WO 2011156447 A1 * | 12/2011 |
| WO | 2014/052743 A1 | 4/2014 |

OTHER PUBLICATIONS

Search Report and Written Opinion for International Application No. PCT/US13/62155, mailed Nov. 27, 2013, 8 pages.

(Continued)

*Primary Examiner* — Grant Sitta
*Assistant Examiner* — Kirk Hermann
(74) *Attorney, Agent, or Firm* — Brake Hughes Bellermann LLP (57) ABSTRACT

Trackpad apparatus and computing devices including trackpad apparatus are disclosed. In an example implementation, a trackpad apparatus includes a capacitive touch-sensing pattern disposed on a top surface of the trackpad apparatus and a capacitive pressure-sensing pattern disposed below the capacitive touch-sensing pattern. The trackpad apparatus also includes at least one controller. The at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus. In the example trackpad apparatus, the at least one controller and the capacitive pressure-sensing pattern are collectively configured to detect location-specific changes in charge coupling in the capacitive pressure-sensing pattern resulting from pressure being applied to the top surface of the trackpad apparatus.

24 Claims, 7 Drawing Sheets

(56) References Cited

U.S. PATENT DOCUMENTS

| | | |
|---|---|---|
| 2006/0197753 A1 | 9/2006 | Hotelling |
| 2007/0240044 A1 | 10/2007 | Fux et al. |
| 2007/0247431 A1 | 10/2007 | Skillman et al. |
| 2007/0248799 A1* | 10/2007 | DeAngelis et al. ...... G01L 1/146 428/209 |
| 2008/0048990 A1* | 2/2008 | Cho et al. ...................... 345/173 |
| 2008/0084387 A1 | 4/2008 | Mcardle |
| 2008/0158145 A1* | 7/2008 | Westerman ................... 345/156 |
| 2008/0266143 A1 | 10/2008 | Ohshita et al. |
| 2008/0280658 A1 | 11/2008 | Clemens |
| 2009/0046065 A1 | 2/2009 | Liu et al. |
| 2009/0219257 A1* | 9/2009 | Frey et al. ...................... 345/173 |
| 2009/0284495 A1* | 11/2009 | Geaghan et al. ............... 345/174 |
| 2009/0322687 A1 | 12/2009 | Duncan et al. |
| 2010/0053087 A1* | 3/2010 | Dai et al. ...................... 345/168 |
| 2011/0018556 A1* | 1/2011 | Le et al. ........................ 324/654 |
| 2011/0134071 A1 | 6/2011 | Kim et al. |
| 2011/0273396 A1 | 11/2011 | Chung |
| 2012/0038583 A1* | 2/2012 | Westhues et al. ............. 345/174 |
| 2012/0218210 A1 | 8/2012 | DeCaro et al. |
| 2012/0218221 A1 | 8/2012 | Igeta |
| 2013/0038572 A1 | 2/2013 | Frey et al. |
| 2013/0063391 A1 | 3/2013 | Kang et al. |
| 2013/0155001 A1 | 6/2013 | Yilmaz et al. |

OTHER PUBLICATIONS

Advisory Action for U.S. Appl. No. 12/973,577, mailed Aug. 27, 2013, 3 pages.
Advisory Action for U.S. Appl. No. 13/073,514, mailed Jan. 6, 2014, 3 pages.
Advisory Action for U.S. Appl. No. 13/073,514, mailed Sep. 13, 2013, 2 pages.
Final Office Action for U.S. Appl. No. 12/973,577, mailed on Jun. 13, 2013, 22 pages.
Final Office Action for U.S. Appl. No. 13/073,514, mailed on Jul. 3, 2013, 12 pages.
Non Final Office Action for U.S. Appl. No. 12/973,577, mailed on Jan. 24, 2013, 17 pages.
Non Final Office Action for U.S. Appl. No. 12/973,577, mailed on Sep. 27, 2013, 15 pages.
Non Final Office Action for U.S. Appl. No. 13/073,514, mailed on Jan. 17, 2014, 11 pages.
Non Final Office Action for U.S. Appl. No. 13/073,514, mailed on Sep. 21, 2012, 11 pages.
Notice of Allowance for U.S. Appl. No. 12/973,577, mailed Feb. 6, 2014, 5 pages.
Response to Final Office Action for U.S. Appl. No. 12/973,577, filed on Aug. 13, 2013, 13 pages.
Buxton et al., "Issues and Techniques in Touch-Sensitive Tablet Input",Computer Systems Research Institute, vol. 19, No. 3, 1985, pp. 215-224.
Response to Final Office Action for U.S. Appl. No. 13/073,514, filed on Sep. 3, 2013, 10 pages.
Response to Non Final Office Action for U.S. Appl. No. 12/973,577, filed on Apr. 17, 2013, 11 pages.
Response to Non Final Office Action for U.S. Appl. No. 13/073,514, filed on Jan. 22, 2013, 8 pages.
Response to Non Final Office Action for U.S. Appl. No. 12/973,577, filed on Jan. 27, 2014, 13 pages.
Restriction Requirement for U.S. Appl. No. 14/101,866, mailed Mar. 13, 2014, 6 pages.
Blasko et al.,"Single-Handed Interaction Techniques for Multiple Pressure-Sensitive Strips", Extended Abstracts of the Conference on Human Factors in Computing Systems (CHI 2004), Apr. 24-29, 2004, pp. 1461-1464.
International Preliminary Report on Patentability from PCT/US2013/062155, dated Mar. 31, 2015, 5 pages.

* cited by examiner

PRESSURE-SENSITIVE TRACKPAD

CROSS REFERENCE TO RELATED APPLICATIONS

This application claims the benefit under 35 U.S.C. §119 of U.S. Provisional Patent Application 61/706,304, filed on Sep. 27, 2012 and entitled "PRESSURE SENSITIVE TRACKPAD." The disclosure of U.S. Provisional Patent Application 61/706,304 is incorporated herein by reference in its entirety.

TECHNICAL FIELD

This document relates, generally, to trackpad (touchpad) pointing devices.

BACKGROUND

Trackpads, which may also be referred to as touchpads, are often used with computing devices, e.g., as pointing devices to facilitate user interaction with an associated computing device. Trackpads may be used with a computing device in place of, or in addition to, a mouse pointing device. For instance, trackpads are often implemented as integrated pointing devices for laptop computing devices, notebook computing devices and netbook computing devices. A trackpad may also be implemented as a non-integrated device that is coupled (e.g., as a peripheral device) to a computing device, such as a desktop computing device or a server computing device, as some examples. Trackpads may, of course, be implemented in other devices as well.

Trackpad (touchpad) devices include a tactile sensing surface (e.g., a capacitive sensing surface), where the trackpad device is generally configured to facilitate interaction by a user with a graphical user interface (GUI) for an associated computing device. For instance, a trackpad device may be configured to detect position and motion of a user's finger or fingers that are in contact with the tactile sensing surface. The detected motion and/or position of a user's finger or fingers on the trackpad may then be used, by the computing device, to determine a relative position on a display screen (in a GUI) that corresponds with the position of the user's finger (or fingers), or to affect movement of a cursor in the GUI, as some examples.

Current trackpads, however, have certain drawbacks. For instance, in some implementations, a user tapping a trackpad's surface may be used to indicate a mouse click, such as to select an item, locate a cursor or launch a program, as some examples. However, in such approaches, a user inadvertently and briefly touching the trackpad may be recognized as unwanted mouse click, which can result in undesired effects and be frustrating for the user. In other instances, a trackpad device may include separate buttons. In such implementations, a user may have to position his or her finger on the trackpad surface and simultaneously click one of the separate buttons in order to perform certain interactions with a GUI (such as to launch an application associated with an icon, select an object in the GUI or move an object in the GUI, as some examples), which may be awkward for the user.

SUMMARY

In a general aspect, a trackpad apparatus includes a capacitive touch-sensing pattern disposed on a top surface of the trackpad apparatus and a capacitive pressure-sensing pattern disposed below the capacitive touch-sensing pattern. The trackpad apparatus also includes at least one controller. The at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus. The at least one controller and the capacitive pressure-sensing pattern are collectively configured to detect location-specific changes in charge coupling in the capacitive pressure-sensing pattern resulting from pressure being applied to the top surface of the trackpad apparatus.

Implementations may include one or more of the following features. For example, the at least one controller and the capacitive pressure-sensing pattern may be collectively configured to detect, for one or more corresponding locations on the top surface of the trackpad apparatus, a respective amount of pressure applied to the top surface of the trackpad apparatus.

The trackpad apparatus may include an insulating layer disposed between the capacitive touch-sensing pattern and the capacitive pressure-sensing pattern. The trackpad apparatus may include a printed circuit board (PCB) substrate disposed between the capacitive touch-sensing pattern and the capacitive pressure-sensing pattern. The PCB substrate may include a glass-reinforced epoxy laminate PCB substrate.

The trackpad apparatus may include a compressible membrane disposed below the capacitive pressure-sensing pattern, where the location-specific changes in charge coupling in the capacitive pressure-sensing pattern include respective decreases in location-specific charge coupling in the capacitive pressure-sensing pattern resulting from corresponding increases in location-specific charge coupling to an electrical ground due to displacement of the compressible membrane. The compressible membrane may include at least one of silicone, polyethylene terephthalate and air.

The trackpad apparatus may include a compressible membrane disposed between a first layer of the capacitive pressure-sensing pattern and a second layer of the capacitive pressure-sensing pattern, where the location-specific changes in charge coupling in the capacitive pressure-sensing pattern include respective location-specific increases in charge coupling between the first layer of the capacitive pressure-sensing pattern and the second layer of the capacitive pressure-sensing pattern due to displacement of the compressible membrane. The compressible membrane may include at least one of silicone, polyethylene terephthalate and air.

The at least one controller may be configured to resolve one or more geometric patterns corresponding with the detected location-specific reductions in charge coupling in the capacitive touch-sensing pattern and filter the resolved one or more geometric patterns based on one or more pattern filtering criteria. The one or more pattern filtering criteria may include at least one of finger ellipse pattern matching criteria and palm pattern rejection criteria. The at least one controller may be configured to filter the detected location-specific changes in charge coupling in the capacitive pressure-sensing pattern based on one or more resolved geometric patterns and pattern filtering criteria.

The at least one controller may be configured to detect movement of the one or more electrically conductive objects across the top surface of the trackpad apparatus based on movement of the detected location-specific reductions in charge coupling in the capacitive touch-sensing pattern. The at least one controller may be configured to detect movement of the one or more electrically conductive objects across the top surface of the trackpad apparatus based on movement of the detected location-specific changes in charge coupling in the capacitive pressure-sensing pattern.

In another general aspect, a computing device includes a display device, where the computing device is configured to render a graphical user interface (GUI) on the display device. The computing device also includes a trackpad apparatus that is configured to facilitate user interaction with the GUI. The trackpad apparatus includes a capacitive touch-sensing pattern disposed on a top surface of the trackpad apparatus and a capacitive pressure-sensing pattern disposed below the capacitive touch-sensing pattern. The trackpad apparatus also includes at least one controller. The at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus. The at least one controller and the capacitive pressure-sensing pattern are collectively configured to detect location-specific changes in charge coupling in the capacitive pressure-sensing pattern resulting from pressure being applied to the top surface of the trackpad apparatus. User interaction with the GUI is based on the detected location-specific reductions in charge coupling in the capacitive touch-sensing pattern and the detected location-specific changes in charge coupling in the capacitive pressure-sensing pattern.

Implementations may include one or more of the following features. For example, the at least one controller and the capacitive pressure-sensing pattern may be collectively configured to, for one or more corresponding locations on the top surface of the trackpad apparatus, detect a respective amount of pressure applied to the top surface of the trackpad apparatus. User interaction with the GUI may be based on the detected respective amounts of pressure for the one or more corresponding locations on the top surface of the trackpad apparatus.

The trackpad apparatus may include an insulating layer disposed between the capacitive touch-sensing pattern and the capacitive pressure-sensing pattern. The trackpad apparatus may include a compressible membrane disposed below the capacitive pressure-sensing pattern. The location-specific changes in charge coupling in the capacitive pressure-sensing pattern may include respective decreases in location-specific charge coupling in the capacitive pressure-sensing pattern resulting from corresponding increases in location-specific charge coupling to an electrical ground due to displacement of the compressible membrane.

The trackpad apparatus may include a compressible membrane disposed between a first layer of the capacitive pressure-sensing pattern and a second layer of the capacitive pressure-sensing pattern. Location-specific changes in charge coupling in the capacitive pressure-sensing pattern may include respective location-specific increases in charge coupling between the first layer of the capacitive pressure-sensing pattern and the second layer of the capacitive pressure-sensing pattern due to displacement of the compressible membrane.

The at least one controller may be configured to resolve one or more geometric patterns corresponding with the detected location-specific reductions in charge coupling in the capacitive touch-sensing pattern; filter the resolved one or more geometric patterns based on one or more pattern filtering criteria; and/or filter the detected location-specific changes in charge coupling in the capacitive pressure-sensing pattern based on the one or more resolved geometric patterns and the pattern filtering criteria. User interaction with the GUI may be based on the filtered one or more geometric patterns and the filtered location-specific changes in charge coupling in the capacitive pressure-sensing pattern.

In another general aspect, a trackpad apparatus includes a capacitive touch-sensing pattern disposed on a top surface of the trackpad apparatus and a capacitive pressure-sensing pattern disposed below the capacitive touch-sensing pattern. The trackpad apparatus also includes at least one controller. The at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus. The at least one controller and the capacitive pressure-sensing pattern are collectively configured to detect location-specific changes in charge coupling in the capacitive pressure-sensing pattern resulting from pressure being applied to the top surface of the trackpad apparatus. The at least one controller is configured to resolve one or more geometric patterns corresponding with the detected location-specific reductions in charge coupling in the capacitive touch-sensing pattern; filter the resolved one or more geometric patterns based on one or more pattern filtering criteria; and/or filter the detected location-specific changes in charge coupling in the capacitive pressure-sensing pattern based on the one or more resolved geometric patterns and the pattern filtering criteria.

DETAILED DESCRIPTION

Figure 1:
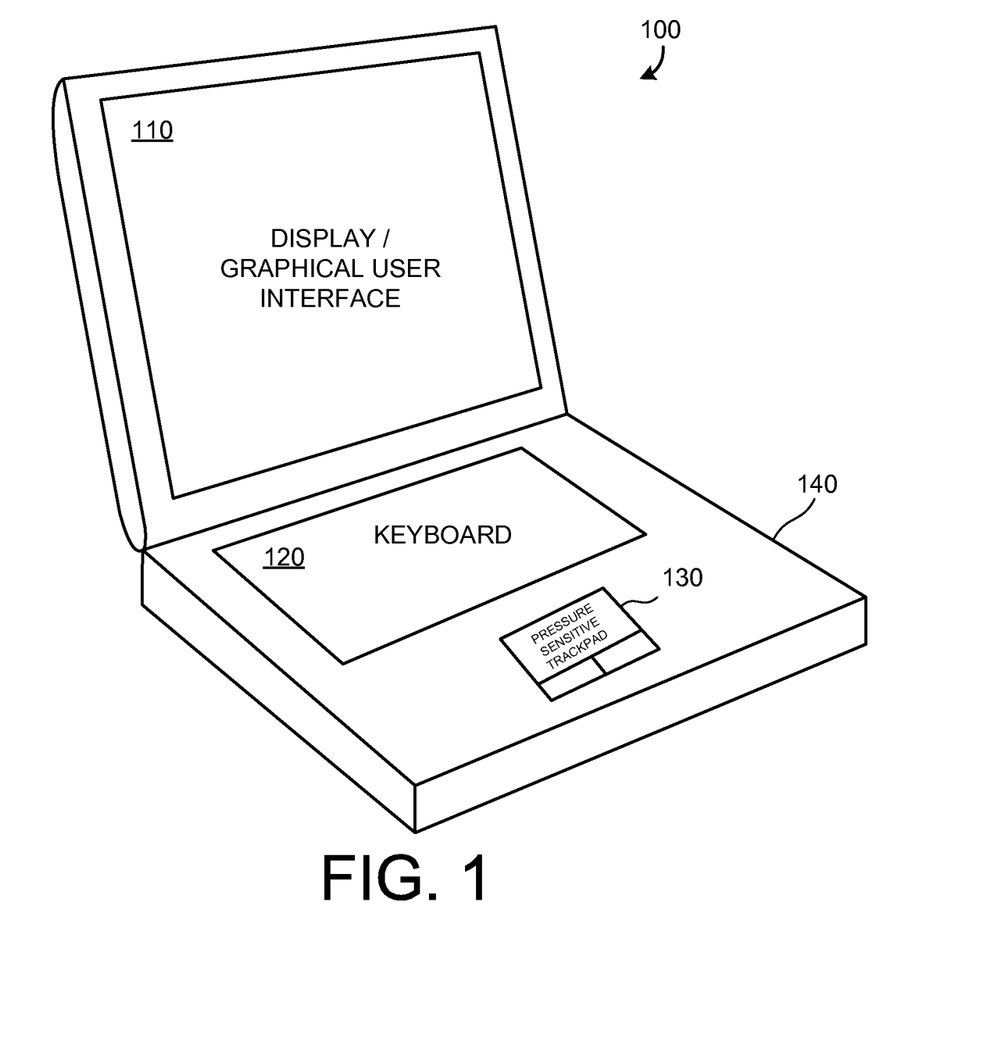
FIG. 1 is a drawing illustrating a computing device in accordance with an example implementation.

FIG. 1 is a drawing illustrating a computing device 100 in accordance with an example implementation. It will be appreciated that the computing device 100 is shown by way of example, and for purposes of illustration. In some implementations, the computing device 100 may take the form of a laptop computer, a notebook computer or netbook computer. In other implementations, the computing device 100 may have other configurations. For instance, the computing device 100 may be a tablet computer, a desktop computer, a server computer, or a number of other computing or electronics devices where a pressure-sensitive trackpad apparatus (trackpad device) 130, such as those described herein, may be used to facilitate interaction with a corresponding device (e.g., via a graphical user interface (GUI)). Throughout this document, the terms trackpad, trackpad device, trackpad apparatus, touchpad, touchpad device and touchpad apparatus may be used interchangeably. Also throughout this document, the terms computing device, computing system and electronic device may be used interchangeably.

The computing device 100 shown in FIG. 1 includes a display device 110, a keyboard 120, a pressure-sensitive trackpad apparatus 130 and a chassis 140. As indicated in FIG. 1, the display device 110 (e.g., in conjunction with other elements of the computing device 100) may be configured to render a GUI that allows a user to interact with the computing device 100, such as to run programs, surf the Internet or World Wide Web, or draft documents, as some examples. A user of the computing device 100 may interact with the computing device 100 via the GUI rendered on the display device 110 using the keyboard 120, such as to enter text or commands. The keyboard 120 may take a number of forms, and the particular arrangement of the keyboard 120 will depend on the particular implementation.

A user may also interact with the computing device 100 via the GUI rendered on the display device 110 using the pressure-sensitive trackpad 130, such as to move a cursor, select objects, launch programs from icons or move objects in the GUI, as some examples. Of course, other interactions with the GUI are possible using the pressure-sensitive trackpad 130. The trackpad 130 may be implemented in a number of ways, such as using the techniques described herein, for example. It will be appreciated that the particular configuration of the trackpad 130 may vary and the configuration used will depend on the specific implementation. For instance, the trackpad may be larger, or smaller in some implementations. For example, in one implementation, the trackpad may be increased in size and be disposed in (replace) the area that includes the keyboard 120.

The chassis 140 of the computing device 100 may be used to house various components of the computing device 110, such as the trackpad 130, a processor motherboard and system memory (e.g., including volatile and non-volatile memory), as well as a number of other components. The chassis 140 may also be used to establish an electrical ground, which may also be referred to as chassis ground, for one or more components of the computing device 100, such as for the trackpad 130. For instance, in one example, the chassis 140 may comprise a metal frame within a polymer housing. In this example, the metal frame of the chassis 140 may be connected to an electrical ground of a power supply that is included in the computing device 100 in order to provide electrical (chassis) ground to the trackpad 130. It will be appreciated that other arrangements for providing a chassis ground are possible.

Figure 2:
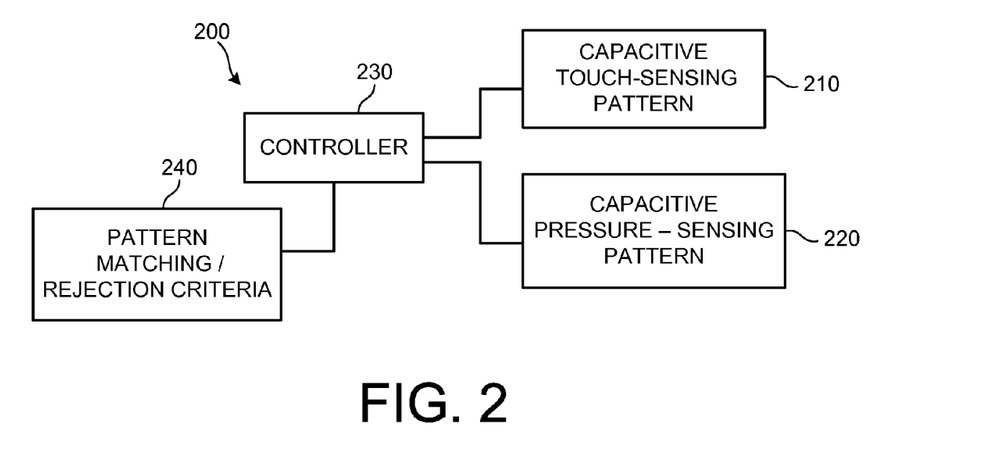
FIG. 2 is a block diagram illustrating a pressure-sensitive trackpad apparatus in accordance with an example implementation.

FIG. 2 is a block diagram illustrating a pressure-sensitive trackpad apparatus 200 in accordance with an example implementation. The trackpad 200 may be implemented, for example, in the computing device 100 as the trackpad apparatus 130. Of course, the trackpad 200 may be implemented in conjunction with other computing devices and the computing device 100 may include pressure-sensitive trackpads having other configurations.

As shown in FIG. 2, the trackpad apparatus 200 includes a capacitive touch-sensing pattern 210, a capacitive pressure-sensing pattern 220, a controller 230 and pattern matching/rejection criteria 240. It will be appreciated that the configuration of the trackpad 200 is given by way of example and for purposes of illustration. In certain implementations, the trackpad 200 may include other elements, or may be arranged in different fashions. For instance, the trackpad 200 may include an insulating layer that is disposed between the touch-sensing pattern 210 and the pressure-sensing pattern 220. In other instances, the pattern matching/rejection criteria 240 may be included in the controller 230. In still other implementations, pattern matching and/or pattern rejection, such as described herein, may be performed by other elements of a computing system (e.g., other than the controller 230) in which the trackpad 200 is implemented, such as a separate.

In the trackpad 200, the touch-sensing pattern 210 may be disposed on a top surface of the trackpad 200 and provide a tactile sensing surface for detecting (e.g., in conjunction with the controller 230) the presence and/or movement of one or more electrically conductive and electrically grounded objects, such as a user's finger or fingers, for example. In an example implementation, the touch-sensing pattern 210 may be implemented using a multi-layer array (matrix) of capacitors. In such an approach, the touch-sensing pattern 200 may include a top layer of closely-spaced parallel-arranged conductors and a bottom layer of closely-spaced parallel-arranged conductors that are oriented in a perpendicular arrangement with the conductors of the top layer. The top layer and the bottom layer of the touch-sensing pattern 210 may be separated by an insulating (dielectric) layer, such that the conductors in the top layer and the bottom layer form respective capacitors, through the dielectric layer, at each crossing point of a conductor in the top layer and a conductor in the bottom layer. Such an arrangement may be used to form a tightly spaced matrix of capacitors.

In such an approach, the controller 230 may be configured to sequentially apply a high frequency signal between conductor pairs in such a two-dimensional capacitor matrix. The amount of charge that is coupled through the capacitors at each crossing point of the conductors of the top layer and the conductors of the bottom layer of touch-sensing pattern 210 would be proportional to the respective capacitance at each crossing point. When the sensing surface of the touch-sensing pattern 210 does not have any electrically conductive objects in contact with it, charge coupling may be substantially uniform across the capacitive matrix of the touch-sensing pattern 210.

However, when an electrically grounded object (e.g., an object that is electrically grounded relative to the top layer of the touch-sensing pattern 210), such as a user's finger or fingers, is (are) placed in contact with the sensing surface of the touch-sensing pattern 210, some of the charge from the capacitors in the contacted area or areas would be shunted to the grounded object or objects. The charge that is shunted to the grounded object or objects would then result in a change (e.g., a decrease) in the apparent capacitance in the area or areas with which the electrically grounded objects or objects are in (electrical) contact with the touch-sensing pattern 210.

The controller 230 may be configured to detect such changes in apparent capacitance by detecting location-specific reductions in charge coupling (e.g., at the contacted areas) in the capacitive touch-sensing pattern 210. Accordingly, the controller 230, in conjunction with the touch-sensing pattern 210, may detect the position or positions of a user's finger or fingers on the touch-sensing pattern 210 and/or movement of a user's finger or fingers across the touch-sensing pattern 210 based on detection and/or changes in location of such location-specific reductions in charge coupling. Of course, other approaches for implementing the capacitive touch-sensing pattern 210 are possible. For purposes of this disclosure, such detected location-specific reductions in charge coupling corresponding with the position(s) of a user's finger or fingers and/or movement of a user's finger or fingers on the touch-sensing pattern 210 may be referred to, hereinafter, as "touch data."

In the trackpad 200, the capacitive pressure-sensing pattern 220 may be disposed below the capacitive touch-sensing pattern 210. As with the touch-sensing pattern 210, the pressure-sensing pattern 220 may be implemented using a multi-layer array of capacitors that includes a top layer of closely-spaced parallel-arranged conductors and a bottom layer of closely-spaced parallel-arranged conductors that are oriented in a perpendicular arrangement with the conductors of the top layer. The top layer and the bottom layer of the pressure-sensing pattern 220 may also be separated by an insulating (dielectric) layer, such that the conductors in the top layer and the bottom layer form respective capacitors, through the dielectric layer, at each crossing point of the conductors in the top layer and the conductors in the bottom layer to form a tightly spaced matrix of capacitors.

In such an approach, the controller 230 may be configured, in like fashion as with the touch-sensing pattern 210, to sequentially apply a high frequency signal between conductor pairs in the two-dimensional capacitor matrix of the pressure-sensing pattern 220. As previously discussed, the amount of charge that is coupled through the capacitors at each crossing point of conductors in the top layer and the conductors in the bottom layer would be proportional to the respective capacitance at each crossing point. When the pressure-sensing pattern 220 is not displaced (e.g., at one or more locations) by an object or objects (e.g., a user's finger or fingers) applying pressure to the surface of the trackpad 200, charge coupling in the pressure-sensing pattern 220 may be substantially uniform across its capacitive matrix.

However, when pressure is applied at one or more locations on the surface of the trackpad 200, this pressure may cause location-specific displacement of the pressure-sensing pattern 220 at a location or locations that is (are) coincident with the location or locations where such pressure is applied. Such location-specific displacement of the pressure-sensing pattern 220 may result in corresponding location-specific changes in charge coupling in the pressure-sensing pattern 220. Depending on the particular implementation, such location-specification changes in charge coupling corresponding with the location or locations at which pressure is applied may be detected (e.g., by the controller 230) as either locations-specific increases or location-specific decreases in charge coupling in the pressure-sensing pattern 220.

Figure 4A:
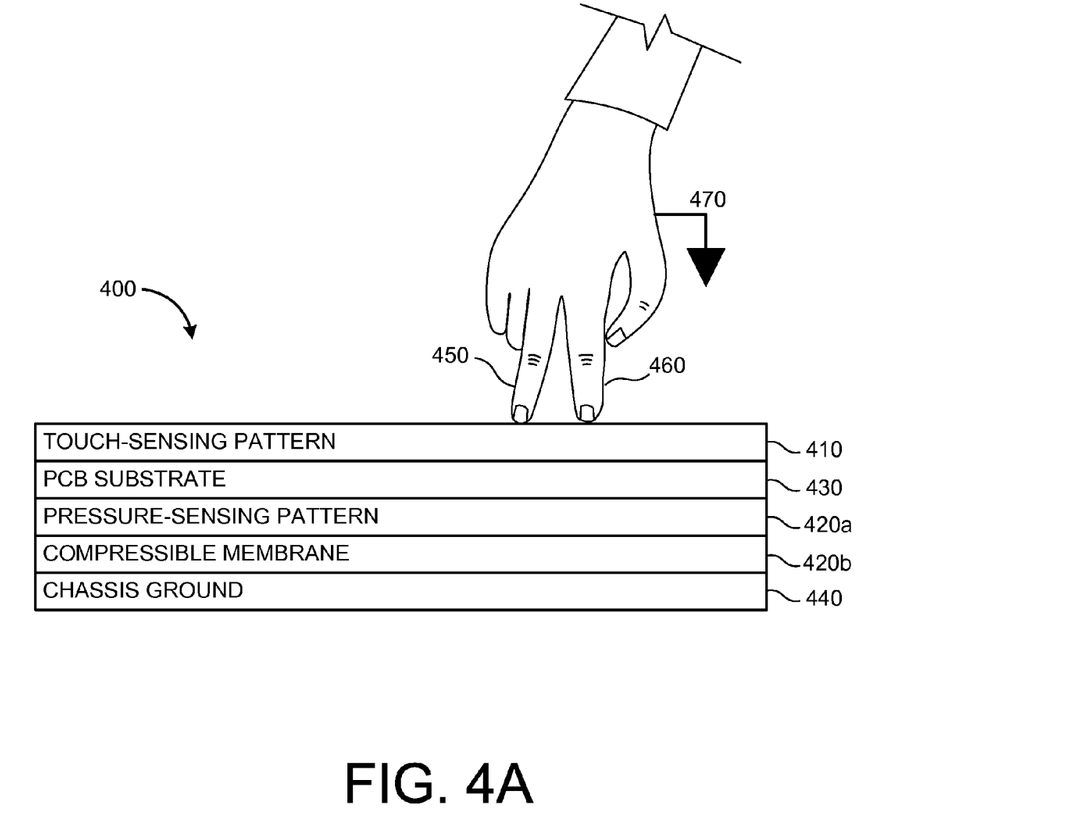
FIGS. 4A and 4B are diagrams illustrating operation of a pressure-sensitive trackpad apparatus in accordance with an example implementation.
Figure 4B:
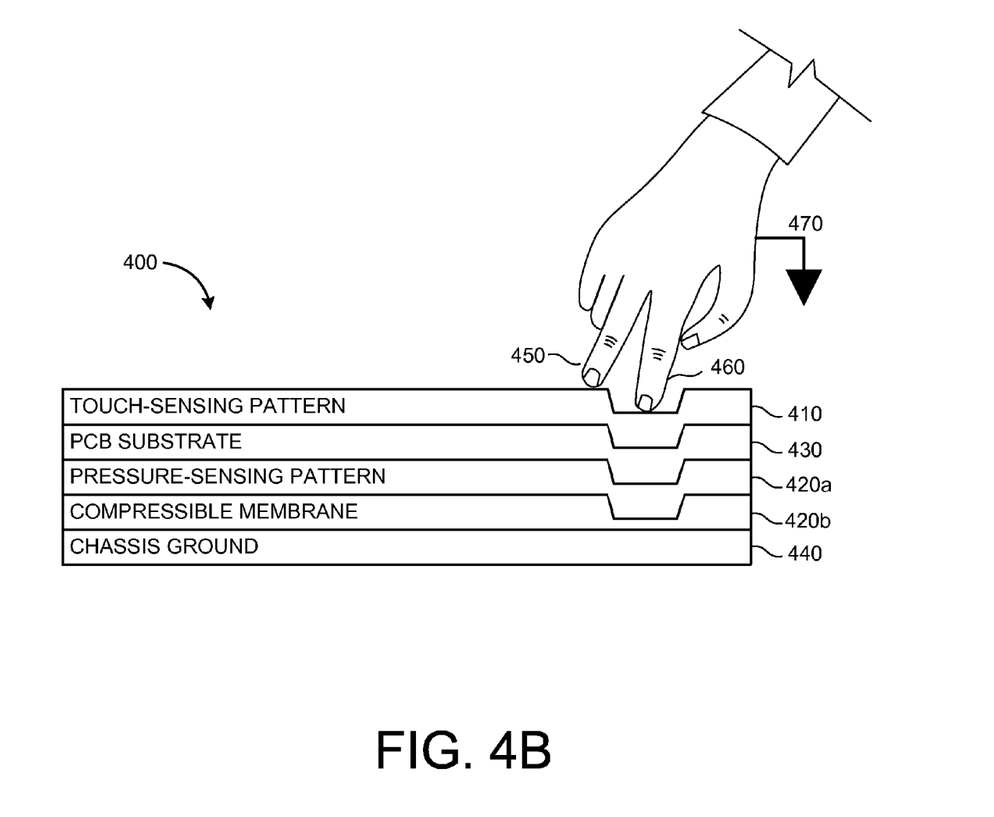
Figure 5A:
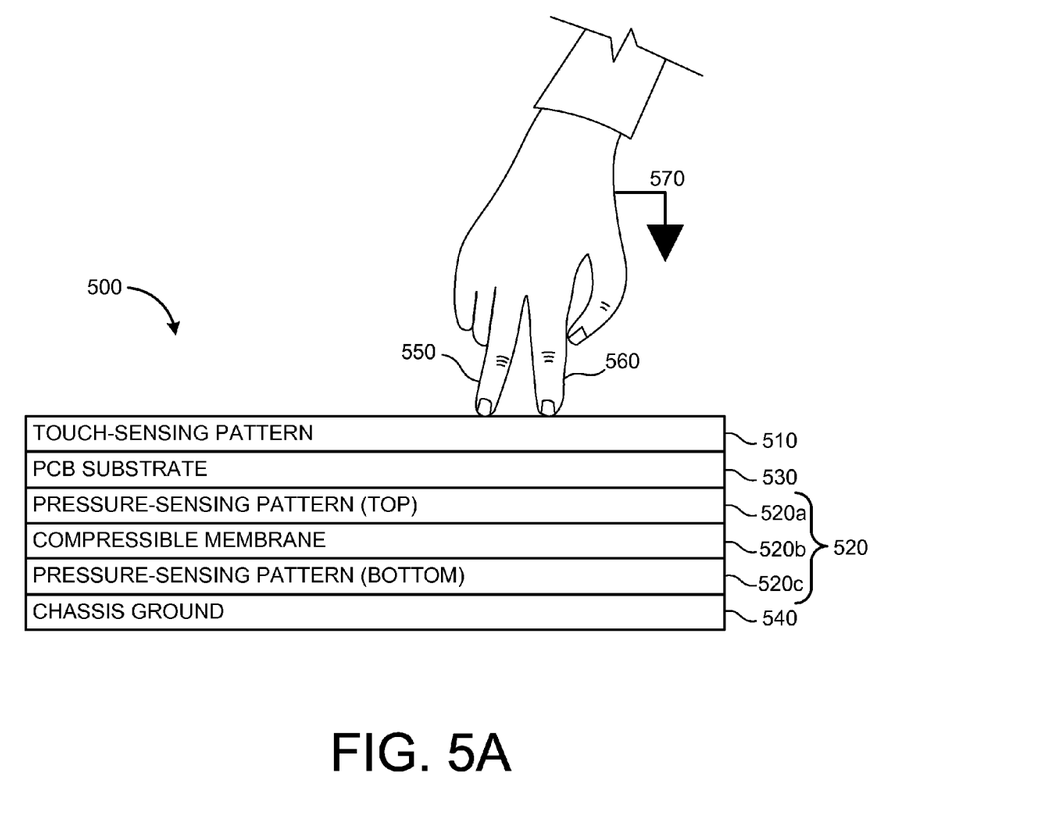
FIGS. 5A and 5B are diagrams illustrating operation of a pressure-sensitive trackpad apparatus in accordance with another example implementation.
Figure 5B:
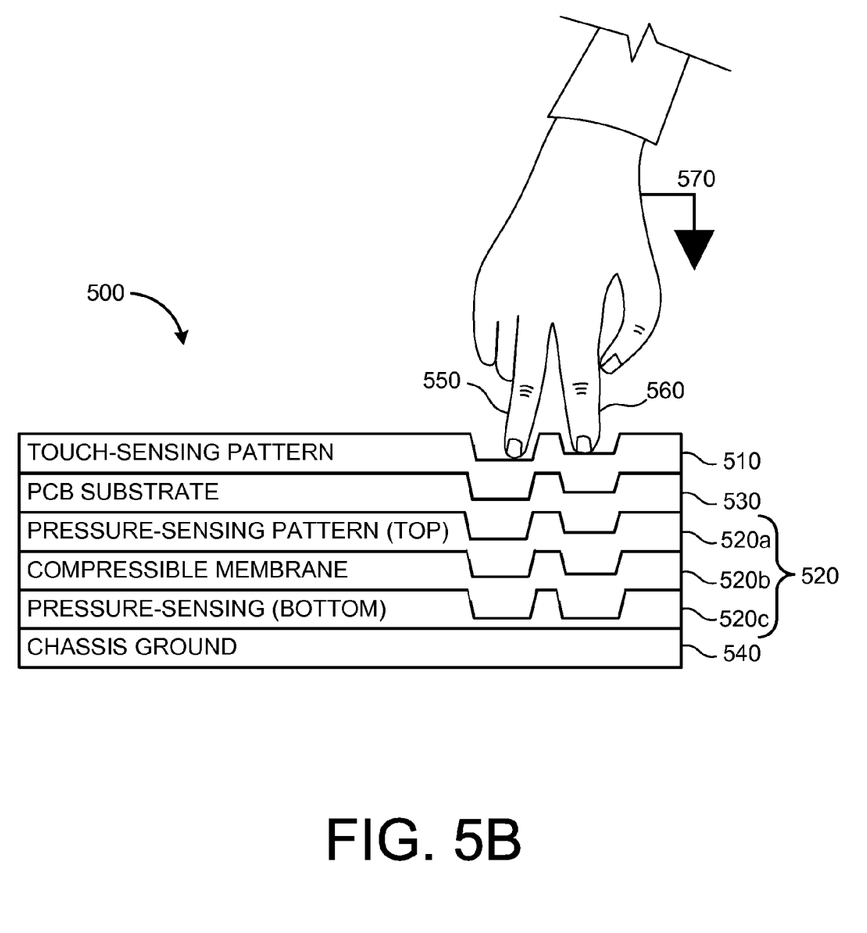

For instance, such location-specific changes in charge coupling in the pressure-sensing pattern 220 may be detected as location-specific decreases in charge coupling (such as in the implementation shown in FIG. 4), or may be detected as location-specific increases in charge coupling (such as in the implementation shown in FIG. 5). The implementations illustrated in FIGS. 4 and 5 will be described in further detail below. For purposes of this disclosure, such detected location-specific changes in charge coupling resulting from pressure applied to one or more locations on a trackpad surface may be referred to, hereinafter, as "pressure data."

In the trackpad apparatus 200 shown in FIG. 2, the controller 230 may implemented in a number of manners. For instance, the controller 230 may be implemented using a general purpose programmable processor or controller. In other implementation, the controller 230 may be implemented using an application specific integrated circuit. In still other approaches, the controller 230 may be implemented using firmware and/or software in the form of machine readable instructions that may be executed by a general purpose processor or controller. The controller 230 may also be implemented using a combination of the techniques discussed above, or may be implemented using other techniques and/or devices.

In an example implementation, the controller 230 may use the pattern matching/rejection criteria 240 (which is referred to, hereinafter, as pattern filtering criteria 240) to filter touch data and pressure data received from, respectively, the touch-sensing pattern 210 and the pressure-sensing pattern 220. Examples of such criteria are described below with respect to FIG. 6.

Briefly, however, the controller 230 may be configured to resolve one or more geometric patterns corresponding with touch data received from the touch-sensing pattern 210. For instance, if a user places two fingers in contact with the touch-sensing pattern 210, the controller 230 may resolve respective geometric patterns associated with each of the user's fingers that are in contact with the touch-sensing pattern 210 from touch data (e.g., location-specific reductions in charge coupling) corresponding with each of the user's fingers. The controller 230 may be further configured to compare the resolved geometric patterns with the pattern filtering criteria 240 and accept or reject the touch data (or portions of the touch data) based on that comparison.

Such an approach may allow the trackpad apparatus 200 to reject touch data that may be inadvertent or undesirable to use when interacting with a GUI. For example, the pattern filtering criteria 240 may be used to reject touch data that results from a user resting his or her palm, or the side of his or her hand on the trackpad 200. Further, the pattern filtering criteria 240 may also be used to accept touch data with certain patterns, such as patterns that correspond with a user's fingertip or fingertips. The controller 230 may also be configured to filter pressure-data in a similar fashion, e.g., by resolving geometric patterns in the pressure data and comparing those resolved patterns with the pattern filtering criteria 240.

In other implementations, the controller 230 may be configured to correlate touch data with pressure data and filter the pressure data based on both the geometric patterns resolved from the touch data and the pattern filtering criteria 240. In such an approach, if the controller 230 identifies pressure data that does not have corresponding touch data (e.g., a coincident location), that pressure data may be filtered out and not provided to a corresponding computing device to affect interaction with a GUI. Also, in such an implementation, pressure data that does have corresponding touch data may be further filtered by applying geometric patterns resolved from the touch data (e.g., at coincident location(s)) and the pattern filtering criteria 240 to the pressure data.

The controller 230 may also be configured to detect movement of one or more electrically conductive objects (e.g., a user's finger or fingers) across the top surface of the trackpad apparatus based on movement of the detected location-specific reductions in charge coupling in the capacitive touch-sensing pattern. For instance, the controller 230 may be configured to compare current touch data with previous touch data in order to detect such movement. In like fashion, the controller 230 may also be configured to detect one or more objects applying pressure and moving across the top surface of the trackpad apparatus based on changes in pressure data. For example, the controller 230 may be configured to compare current pressure data with previous pressure data to detect such movement. In such approaches, filtered pressure data may be used to indicate mouse clicks, or may be used to indicate other desired interactions with a GUI, thus allowing a user to interact with objects in a GUI (e.g., select objects, launch programs from icons and/or move objects) without having to use separate buttons.

Figure 3:
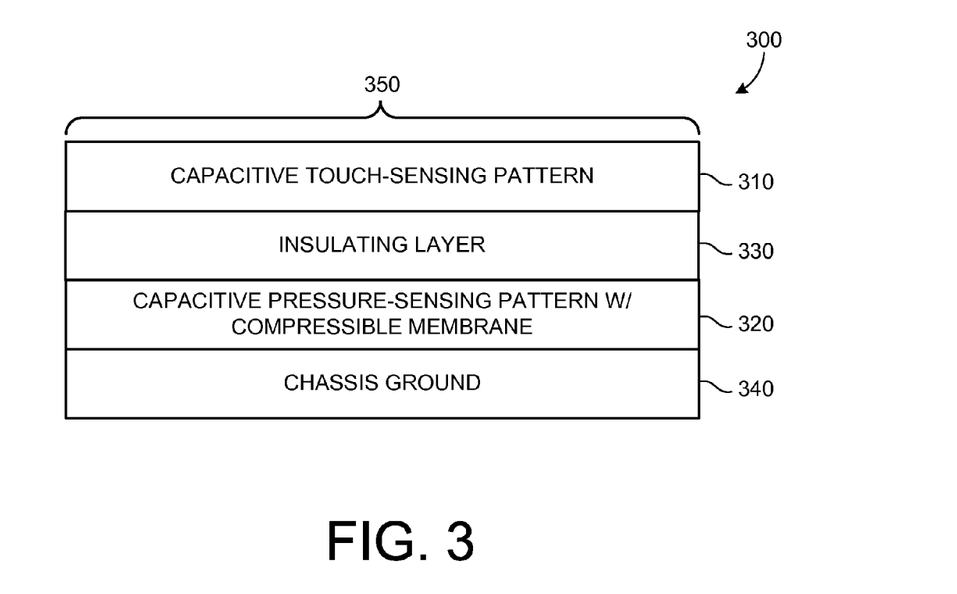
FIG. 3 is a diagram illustrating a pressure-sensitive trackpad apparatus in accordance with an example implementation.

FIG. 3 is a diagram illustrating a pressure-sensitive trackpad apparatus 300 in accordance with an example implementation. The trackpad 300 shown in FIG. 3 illustrates an example structure that may be used to implement a pressure-sensitive trackpad apparatus. For instance, the structure of the trackpad 300 may be used to implement the trackpad 200 shown in FIG. 2. Accordingly, for illustrative purposes, like elements of the trackpad 300 are referenced with 300 series reference numbers corresponding with the 200 series reference number used in FIG. 2. Also, while not shown in FIG. 3, the trackpad 300 may be coupled with a controller in like fashion as shown for the controller 230 in the trackpad 200 illustrated in FIG. 2.

As illustrated in FIG. 3, the trackpad 300 includes a capacitive touch-sensing pattern 310, a capacitive pressure-sensing pattern 320, an insulating layer 330 that is disposed between the touch-sensing pattern 310 and the pressure-sensing pattern 320, and a chassis ground 340. The upper surface 350 of the trackpad 300 may operate as a tactile sensing surface for the trackpad 300 to gather touch data, such as in the manners described herein.

In the trackpad 300, the touch-sensing pattern 310 and the pressure-sensing pattern 320 may be implemented and operate in a similar fashion as was discussed above with respect to the touch-sensing pattern 210 and the pressure-sensing pattern 220 of the trackpad 200 shown in FIG. 2. Accordingly, for purposes of brevity and clarity, the entirety of the details of the touch-sensing pattern 210 and the pressure-sensing pattern 220 are not repeated again here with respect to the touch-sensing pattern 310 and the pressure-sensing pattern 320.

As is indicated in FIG. 3, the pressure-sensing pattern 320 may be implemented with a compressible membrane. The particular arrangement of the capacitive matrix and the compressible membrane of the pressure-sensing pattern 320 will depend on the particular implementation. Two such implementations are illustrated, respectively, in FIGS. 4 and 5 and are discussed further below. Of course, other arrangements are possible.

In the trackpad 300, the stiffness (e.g., material) of each of the touch-sensing pattern 310, the insulating layer 330, the capacitive matrix pattern conductor layer(s) of the pressure-sensing pattern 320, the dielectric layer of the pressure-sensing pattern 320 and the compressible membrane of the pressure-sensing pattern 320 may be selected such that the compressible membrane is the first to displace when pressure is applied to the surface 350, such as by a user's finger or fingers. In certain implementations, such as the implementation shown in FIG. 5, the compressible membrane may also act as the dielectric layer for the pressure-sensing pattern 320, the operation of which will be discussed in further detail below. The chassis ground 340 may be implemented using a metal frame, such as previously described. In such approaches, the chassis ground would be highly resistant to being displaced as a result of pressure applied to the surface 350 of the trackpad 300.

FIGS. 4A and 4B are diagrams illustrating operation of a pressure-sensitive trackpad apparatus 400 in accordance with an example implementation. The trackpad 400 shown in FIGS. 4A and 4B illustrates an example structure of a pressure-sensitive trackpad apparatus that may be used to implement the trackpads 200 and 300 shown, respectively, in FIGS. 2 and 3. Accordingly, for illustrative purposes, like elements of the trackpad 400 are referenced with 400 series reference numbers corresponding with the 200 and 300 series reference numbers used in FIGS. 2 and 3. While not shown in FIG. 4, the trackpad 400 may be coupled with a controller in like fashion as shown for the controller 230 in the trackpad 200 illustrated in FIG. 2, or multiple controllers.

As illustrated in FIGS. 4A and 4B, the trackpad 400 includes a touch-sensing pattern 410, a pressure-sensing pattern 420a, a compressible membrane 420b that is disposed below the pressure-sensing pattern 420a, a printed circuit board (PCB) substrate (e.g., insulating layer) 430 that is disposed between the touch-sensing pattern 410 and the pressure-sensing pattern 420a, and a chassis ground 440. The compressible membrane 420b may be implemented using, for example, silicone, synthetic polymers, such as polyethylene terephthalate (PET), air, or a combination these or other materials. For instance, in an example implementation of the trackpad 400, the compressible membrane 420b may include a matrix of PET spacer dots, which creates a gap between the pressure sensing pattern 420a and the chassis ground 440, while the rest of the compressible membrane 420b is air. The PCB substrate 430 may be implemented using a glass-reinforced epoxy laminate PCB substrate, such as FR-4, for example. The specific materials used will, of course, depend on the particular implementation.

For instance, in like fashion as was discussed with respect to the trackpad 300, the stiffness (material) of each of the touch-sensing pattern 410, the PCB substrate 430, the pressure-sensing pattern 420a and the compressible membrane 420b may be selected such that the compressible membrane 420b is the first to displace when pressure is applied to the top surface of the trackpad 400, such as by a user's finger or fingers. Further, the chassis ground 440 may be implemented in like fashion as was discussed above with respect to the chassis ground 340, e.g., so as to be resistant to displacement.

In the trackpad 400, the touch-sensing pattern 410 and the pressure-sensing pattern 420a may be implemented and operate in a similar fashion as was discussed above with respect to the touch-sensing pattern 210 and the pressure-sensing pattern 220 of the trackpad 200 shown in FIG. 2. Accordingly, for purposes of brevity and clarity, the entirety of the details of the touch-sensing pattern 210 and the pressure-sensing pattern 220 are not repeated again here with respect to the touch-sensing pattern 410 and the pressure-sensing pattern 420a. However, additional details with respect to detecting touch data and pressure data using the trackpad 400 are described with reference to FIG. 4.

In FIGS. 4A and 4B, a user's fingers 450 and 460 are illustrated as being in contact (e.g., electrical contact) with a top surface of the trackpad 400. The fingers 450 and 460 are also shown as being connected to an electrical ground 470, where the user would provide an electrical ground with respect to the top surface of the trackpad 400.

In like fashion as previously described, the user's fingers 450 and 460 may shunt charge away from the touch-sensing pattern 410 to the electrical ground 470, thereby changing the apparent capacitance of the touch-sensing pattern 410 where it is contacted by the user's fingers 450 and 460. A controller, such as the controller 230, (not shown in FIGS. 4A and 4B) coupled with the trackpad 400 may detect such changes in apparent capacitance (as touch data) by detecting corresponding reductions in charge coupling in the touch-sensing pattern 410 where it is contacted by the user's fingers 450 and 460. Additionally, movement of the user's fingers 450 and 460 across the surface of the trackpad apparatus 400 may be detected using the techniques described here, such as those that were discussed above with respect to FIG. 2.

As shown in FIG. 4A, the user's fingers 450 and 460 are not applying pressure to the surface of the trackpad 400. In this situation, charge coupling in the pressure-sensing pattern 420a would be substantially uniform across its capacitive matrix. Also the compressible membrane 420b and a chassis ground 440 may create a parasitic capacitance with the pressure-sensing pattern 420a. This parasitic capacitance may be utilized to sense pressure data in the trackpad 400, was will now be described.

As shown in FIG. 4B, pressure is being applied to the surface of the trackpad 400 by the user's finger 460. As illustrated, this pressure results in displacement of the compressible membrane 420b, the pressure-sensing pattern 420a, the PCB substrate 430 and the touch-sensing pattern 410. As discussed above, the stiffness of each of these layers may be selected such that the compressible membrane 420b is the first displace when pressure is applied to the surface of the trackpad 400.

In this situation, the displacement of the pressure-sensing pattern 420a and the compressible membrane 420b will cause an increase in the parasitic capacitance to the chassis ground 440 through the compressible membrane where the displacement occurs. This increase in the parasitic capacitance will result in a corresponding decrease in the apparent capacitance of the pressure-sensing pattern 420a at the location where the displacement occurs. A controller, such as the controller 230 shown in FIG. 2, coupled with the trackpad 400 may detect such decreases in apparent capacitance (pressure) as a result of the pressure applied to the surface of the trackpad 400 as corresponding location-specific decreases in charge coupling at the location of the displacement. Movement of the user's finger 460 across the surface of the trackpad 400 while applying pressure may be detected from pressure data using the techniques described herein, such as previously discussed with respect to FIG. 2. Also, pressure data and touch data for the trackpad apparatus 400 may be filtered using the techniques described herein, such as discussed with reference to FIG. 2 and FIG. 5, for example.

FIGS. 5A and 5B are diagrams illustrating operation of a pressure-sensitive trackpad apparatus 500 in accordance with an example implementation. The trackpad 500 shown in FIGS. 5A and 5B illustrates another example structure of a pressure-sensitive trackpad apparatus that may be used to implement the trackpads 200 and 300 shown, respectively, in FIGS. 2 and 3. Accordingly, for illustrative purposes, like elements of the trackpad 500 are referenced with 500 series reference numbers corresponding with the 200 and 300 series reference numbers used in FIGS. 2 and 3. As with the trackpad 400, while not shown in FIG. 5, the trackpad 500 may be coupled with a controller in like fashion as shown for the controller 230 in the trackpad 200 illustrated in FIG. 2.

As illustrated in FIGS. 5A and 5B, the trackpad 500 includes a touch-sensing pattern 510, a pressure-sensing pattern 520, a PCB substrate 530 that is disposed between the touch-sensing pattern 510 and the pressure-sensing pattern 520, and a chassis ground 540. In the trackpad 500, the pressure-sensing pattern 520 includes a pressure-sensing pattern top (conductor) layer 520a, a compressible membrane 520b that is disposed below the pressure-sensing pattern top layer 520a and a pressure-sensing pattern bottom (conductor) layer 520c The compressible membrane 520b may be implemented in similar fashion as described above with respect to FIG. 4. As with the PCB substrate 430, the PCB substrate 530 may be implemented using a glass-reinforced epoxy laminate PCB substrate, such as FR-4, for example. The specific materials used will, of course, depend on the particular implementation.

As was discussed with respect to the trackpads 300 and 400, the stiffness (materials) of each of the touch-sensing pattern 510; the PCB substrate 530; the pressure-sensing pattern layers 520a and 520c; and the compressible membrane 520b may be selected such that the compressible membrane 520b is the first to displace when pressure is applied to the top surface of the trackpad 500, such as by a user's finger or fingers. Further, the chassis ground 540 may be implemented in like fashion as was discussed above with respect to the chassis grounds 340 and 440, e.g., so as to be resistant to displacement.

In the trackpad 500, as with the trackpad 400, the touch-sensing pattern 510 and the pressure-sensing pattern 520 may be implemented and operate in a similar fashion as was discussed above with respect to the touch-sensing pattern 210 and the pressure-sensing pattern 220 of the trackpad 200 shown in FIG. 2. Accordingly, for purposes of brevity and clarity, the entirety of the details of the touch-sensing pattern 210 and the pressure-sensing pattern 220 are not repeated again here with respect to the touch-sensing pattern 510 and the pressure-sensing pattern 520. The touch-sensing pattern 510 shown in FIG. 5 may operate in substantially the same fashion as the touch-sensing pattern 410 shown in FIG. 4. Accordingly, the entirety of the details of the touch-sensing pattern 410 will not be repeated again here with respect to the touch-sensing pattern 510.

However, in contrast to the compressible membrane 420b of the trackpad 400, which is disposed below the pressure-sensing pattern 420a, the compressible membrane 520b is disposed between the conductor layers 520a and 520b of the pressure-sensing pattern 520 of the trackpad 500. Therefore, in this embodiment, the compressible membrane 520b is part of the pressure-sensing pattern 520 and will act as the dielectric for the capacitive matrix of the pressure-sensing pattern 520. This configuration will result in pressure data being detected in a different manner in the trackpad 500 than was discussed with respect to the trackpad 400. Accordingly, additional details with respect to detecting pressure data using the trackpad 500 are described with reference to FIG. 5.

In FIGS. 5A and 5B, a user's fingers (fingers) 550 and 560 are illustrated as being in contact (e.g., electrical contact) with a top surface of the trackpad 500, and shown as being connected to an electrical ground 570. As with the fingers 450 and 460, the fingers 550 and 560 may shunt charge away from the touch-sensing pattern 510 to the electrical ground 570, which may be detected by a controller as touch data for the trackpad 500.

As shown in FIG. 5A, in like fashion as for the fingers 450 and 460 in FIG. 4A, the fingers 550 and 560 are not applying pressure to the surface of the trackpad 500. In this situation, charge coupling in the pressure-sensing pattern 520 (i.e., through the compressible membrane 520b) would be substantially uniform across its capacitive matrix. In this implementation, parasitic capacitance to the chassis ground 540 may be undesirable as it may adversely reduce charge coupling in the pressure-sensing pattern 520, making detection of pressure data difficult. Therefore, it may be desirable to reduce such parasitic capacitance in such arrangements.

As shown in FIG. 5B, pressure is being applied to the surface of the trackpad 500 by the fingers 550 and 560, with more pressure being applied by the finger 550 than by the finger 560. As illustrated, the pressure by the fingers 550 and 560 results in corresponding displacements of the compressible membrane 520b, the pressure-sensing pattern top layer 520a, the PCB substrate 530 and the touch-sensing pattern 510. As discussed above, the stiffness of each of these layers may be selected such that the compressible membrane 520b is the first displace when pressure is applied to the surface of the trackpad 500.

In this situation, the displacements of the pressure-sensing pattern 520a and the compressible membrane 520b under the fingers 550 and 560 will cause respective location-specific increases in the apparent capacitance of the pressure-sensing layer 520 where the displacements occur. These increases in apparent capacitance will result in corresponding location-specific increases in the amount of charge coupling in the pressure-sensing pattern 520 at the displacement locations. A controller, such as the controller 230 shown in FIG. 2, coupled with the trackpad 500 may detect such increases in apparent capacitance or charge coupling as pressure data. Movement of the fingers 550 and 560 across the surface of the trackpad 500 while applying pressure may be detected from such pressure data using the techniques described herein. Also, pressure data and touch data for the trackpad apparatus 500 may be filtered using the techniques described herein, such as discussed with reference to FIG. 2 and FIG. 6, for example.

A controller coupled with the trackpad 500 may also be configured to determine the respective amount of pressure applied by each of the fingers 550 and 560 to the surface of the trackpad 500. For example, because the finger 550 is applying more pressure than the finger 560 and causes a larger displacement, the location-specific increase in apparent capacitance in the pressure-sensing layer 520 associated with the displacement from the finger 550 will be greater than the location-specific increase in apparent capacitance in the pressure-sensing layer 520 associated with the displacement from the finger 560.

The trackpad apparatus 500, using a controller, may be configured to determine an amount of pressure applied by each of the fingers 550 and 560, from corresponding pressure data. For instance, the pressure amounts may be determined based on respective amounts of location-specific increases in charge coupling in the pressure-sensing layer 520. Such determinations may be provided to a computing system, such as the computing system 100, by the trackpad 500 (e.g., using a controller) and may affect different actions in a GUI based on the amount of pressure applied. For example, a first amount of pressure may cause an item to be selected in a GUI and a second amount of pressure (e.g., greater than the first amount) may cause the item to be opened, such as using a default program or by running a program associated with an icon, as some examples. Of course, such indications of an amount of pressure applied may be used in a number of other ways depending on the particular implementation and/or situation.

Figure 6:
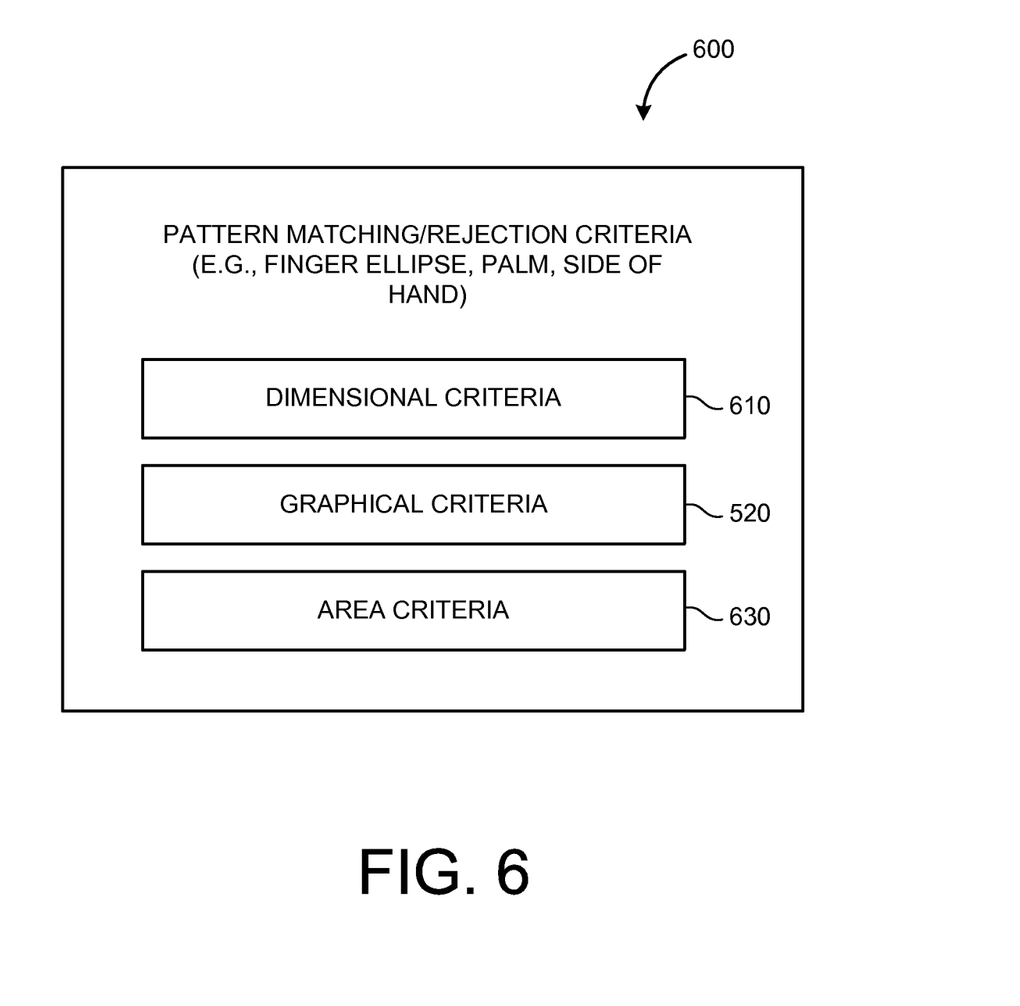
FIG. 6 is a diagram illustrating pattern matching and rejection criteria in accordance with an example implementation.

FIG. 6 is a diagram illustrating pattern matching and rejection (pattern filtering) criteria 600 in accordance with an example implementation. In an example implementation, the pattern filtering criteria 600 may be used to implement the pattern filtering criteria 240 shown in FIG. 2. For instance, the pattern filtering criteria 600 may be used to filter touch data and/or pressure data for a trackpad apparatus using the techniques that have been described herein, such as with respect to FIG. 2. As indicated in FIG. 6, the pattern filtering criteria 600 may define acceptable patterns, such as finger ellipses which would not be filtered out of touch data and/or pressure data received by a trackpad apparatus. The pattern filtering criteria 600 may also define unacceptable patterns, such as palm or side of hand patterns, which would be filtered out of touch data and/or pressure data received by a trackpad apparatus.

As shown in FIG. 6, the pattern filtering criteria 600 includes dimensional criteria 610, graphical criteria 620 and area criteria 630. In such an approach, the dimensional criteria 610 may define dimensions for touch data and/or pressure data that should be accepted, or may define dimensions for touch data and/or pressure data that should be rejected. In some implementations, the dimensional criteria 610 may define both pattern dimensions that should be accepted and pattern dimensions that should be rejected. The graphical criteria 620 may define geometric patterns in a graphical form, which may include graphical patterns that should be accepted and/or graphical patterns that should be rejected. The area criteria 630 may define patterns that should be accepted and/or patterns that should be rejected based on a respective area of a given pattern. For instance, in one implementation, an area threshold may be defined in the area criteria 630. In such an approach, touch data patterns and/or pressure data patterns with an area less than the area threshold may be accepted and patterns with an area greater than the area threshold may be rejected. Of course, other approaches for defining pattern filtering criteria are possible.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A trackpad apparatus comprising:
    a capacitive touch-sensing pattern disposed on a top surface of the trackpad apparatus;
    a capacitive pressure-sensing pattern disposed below the capacitive touch-sensing pattern, wherein the capacitive pressure-sensing pattern is separate and distinct from the capacitive touch-sensing pattern;
    an insulating layer disposed between the capacitive touch-sensing pattern and the capacitive pressure-sensing pattern;
    a compressible membrane disposed below the capacitive pressure-sensing pattern, wherein the compressible membrane is separate and distinct from the insulating layer; and
    at least one controller,
    wherein:
        the at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus; and
        the at least one controller, the capacitive pressure-sensing pattern and the compressible membrane are collectively configured to detect location-specific changes in charge coupling in the capacitive pressure-sensing pattern resulting from pressure being applied to the top surface of the trackpad apparatus, wherein the location-specific changes in charge coupling in the capacitive pressure-sensing pattern are due at least in part to displacement of the compressible membrane.

2. The trackpad apparatus of claim 1, wherein the at least one controller and the capacitive pressure-sensing pattern are collectively further configured to detect, for one or more corresponding locations on the top surface of the trackpad apparatus, a respective amount of pressure applied to the top surface of the trackpad apparatus.

3. The trackpad apparatus of claim 1, wherein the insulating layer comprises a printed circuit board (PCB) substrate disposed between the capacitive touch-sensing pattern and the capacitive pressure-sensing pattern.

4. The trackpad apparatus of claim 3, wherein the PCB substrate comprises a glass-reinforced epoxy laminate PCB substrate.

5. The trackpad apparatus of claim 1, wherein the location-specific changes in charge coupling in the capacitive pressure-sensing pattern comprise respective decreases in location-specific charge coupling in the capacitive pressure-sensing pattern resulting from corresponding increases in location-specific charge coupling to an electrical ground due to displacement of the compressible membrane.

6. The trackpad apparatus of claim 5, wherein the compressible membrane includes at least one of silicone, polyethylene terephthalate and air.

7. The trackpad apparatus of claim 1, wherein the compressible membrane is disposed between a first layer of the capacitive pressure-sensing pattern and a second layer of the capacitive pressure-sensing pattern, wherein the location-specific changes in charge coupling in the capacitive pressure-sensing pattern comprise respective location-specific increases in charge coupling between the first layer of the capacitive pressure-sensing pattern and the second layer of the capacitive pressure-sensing pattern due to displacement of the compressible membrane.

8. The trackpad apparatus of claim 7, wherein the compressible membrane includes at least one of silicone, polyethylene terephthalate and air.

9. The trackpad apparatus of claim 1, wherein the at least one controller is further configured to:
resolve one or more geometric patterns corresponding with the detected location-specific reductions in charge coupling in the capacitive touch-sensing pattern; and
filter the resolved one or more geometric patterns based on one or more pattern filtering criteria.

10. The trackpad apparatus of claim 9, wherein the one or more pattern filtering criteria comprise at least one of a finger ellipse pattern matching criteria and a palm pattern rejection criteria.

11. The trackpad apparatus of claim 9, wherein the at least one controller is further configured to filter the detected location-specific changes in charge coupling in the capacitive pressure-sensing pattern based on the one or more resolved geometric patterns and the pattern filtering criteria.

12. The trackpad apparatus of claim 1, wherein the at least one controller is further configured to detect movement of the one or more electrically conductive objects across the top surface of the trackpad apparatus based on movement of the detected location-specific reductions in charge coupling in the capacitive touch-sensing pattern.

13. The trackpad apparatus of claim 1, wherein the at least one controller is further configured to detect movement of the one or more electrically conductive objects across the top surface of the trackpad apparatus based on movement of the detected location-specific changes in charge coupling in the capacitive pressure-sensing pattern.

14. A computing device comprising:
a display device, the computing device being configured to render a graphical user interface (GUI) on the display device;
a trackpad apparatus configured to facilitate user interaction with the GUI, the trackpad apparatus comprising:
a capacitive touch-sensing pattern disposed on a top surface of the trackpad apparatus, wherein the capacitive pressure-sensing pattern is separate and distinct from the capacitive touch-sensing pattern;
a capacitive pressure-sensing pattern disposed below the capacitive touch-sensing pattern;
an insulating layer disposed between the capacitive touch-sensing pattern and the capacitive pressure-sensing pattern;
a compressible membrane disposed below the capacitive pressure-sensing pattern wherein the compressible membrane is separate and distinct from the insulating layer; and
at least one controller,
wherein:
the at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus;
the at least one controller, the capacitive pressure-sensing pattern and the compressible membrane are collectively configured to detect location-specific changes in charge coupling in the capacitive pressure-sensing pattern resulting from pressure being applied to the top surface of the trackpad apparatus, wherein the location-specific changes in charge coupling in the capacitive pressure-sensing pattern are due at least in part to displacement of the compressible membrane; and
user interaction with the GUI is based on the detected location-specific reductions in charge coupling in the capacitive touch-sensing pattern and the detected location-specific changes in charge coupling in the capacitive pressure-sensing pattern.

15. The computing device of claim 14, wherein:
the at least one controller and the capacitive pressure-sensing pattern are collectively further configured to, for one or more corresponding locations on the top surface of the trackpad apparatus, detect a respective amount of pressure applied to the top surface of the trackpad apparatus; and
user interaction with the GUI is further based on the detected respective amounts of pressure for the one or more corresponding locations on the top surface of the trackpad apparatus.

16. The computing device of claim 14, wherein the location-specific changes in charge coupling in the capacitive pressure-sensing pattern comprise respective decreases in location-specific charge coupling in the capacitive pressure-sensing pattern resulting from corresponding increases in location-specific charge coupling to an electrical ground due to displacement of the compressible membrane.

17. The computing device of claim 14, wherein the compressible membrane is disposed between a first layer of the capacitive pressure-sensing pattern and a second layer of the capacitive pressure-sensing pattern, wherein the location-specific changes in charge coupling in the capacitive pressure-sensing pattern comprise respective location-specific increases in charge coupling between the first layer of the capacitive pressure-sensing pattern and the second layer of the capacitive pressure-sensing pattern due to displacement of the compressible membrane.

18. The computing device of claim 14, wherein:
the at least one controller is further configured to:

resolve one or more geometric patterns corresponding with the detected location-specific reductions in charge coupling in the capacitive touch-sensing pattern;

filter the resolved one or more geometric patterns based on one or more pattern filtering criteria; and filter the detected location-specific changes in charge coupling in the capacitive pressure-sensing pattern based on the one or more resolved geometric patterns and the pattern filtering criteria; and user interaction with the GUI is further based on the filtered one or more geometric patterns and the filtered location-specific changes in charge coupling in the capacitive pressure-sensing pattern.

19. A trackpad apparatus comprising:

a capacitive touch-sensing pattern disposed on a top surface of the trackpad apparatus;

a capacitive pressure-sensing pattern disposed below the capacitive touch-sensing pattern;

a compressible membrane disposed below the capacitive pressure-sensing pattern; and at least one controller, wherein:

the at least one controller and the capacitive touch-sensing pattern are collectively configured to detect location-specific reductions in charge coupling in the capacitive touch-sensing pattern resulting from charge being shunted out of the capacitive touch-sensing pattern by one or more electrically conductive objects being placed in electrical contact with the top surface of the trackpad apparatus;

the at least one controller, the capacitive pressure-sensing pattern and the compressible membrane are collectively configured to detect location-specific changes in charge coupling in the capacitive pressure-sensing pattern resulting from pressure being applied to the top surface of the trackpad apparatus, wherein the location-specific changes in charge coupling in the capacitive pressure-sensing pattern are due at least in part to displacement of the compressible membrane; and the at least one controller is further configured to:

resolve one or more geometric patterns corresponding with the detected location-specific reductions in charge coupling in the capacitive touch-sensing pattern;

filter the resolved one or more geometric patterns based on one or more pattern filtering criteria; and filter the detected location-specific changes in charge coupling in the capacitive pressure-sensing pattern based on the one or more resolved geometric patterns and the pattern filtering criteria.

20. The trackpad apparatus of claim 19, wherein the location-specific changes in charge coupling in the capacitive pressure-sensing pattern comprise respective decreases in location-specific charge coupling in the capacitive pressure-sensing pattern resulting from corresponding increases in location-specific charge coupling to an electrical ground due to displacement of the compressible membrane.

21. The trackpad apparatus of claim 20, wherein the compressible membrane includes at least one of silicone, polyethylene terephthalate and air.

22. The trackpad apparatus of claim 19, wherein the compressible membrane is disposed between a first layer of the capacitive pressure-sensing pattern and a second layer of the capacitive pressure-sensing pattern, wherein the location-specific changes in charge coupling in the capacitive pressure-sensing pattern comprise respective location-specific increases in charge coupling between the first layer of the capacitive pressure-sensing pattern and the second layer of the capacitive pressure-sensing pattern due to displacement of the compressible membrane.

23. The trackpad apparatus of claim 22, wherein the compressible membrane includes at least one of silicone, polyethylene terephthalate and air.

24. The trackpad apparatus of claim 19, further comprising an insulating layer disposed between the capacitive touch-sensing pattern and the capacitive pressure-sensing pattern.

* * * * *